United States Patent [19]

Shyu et al.

[11] Patent Number: 4,878,248
[45] Date of Patent: Oct. 31, 1989

[54] METHOD AND APPARATUS FOR AUTOMATICALLY RECOGNIZING LICENSE PLATE CHARACTERS

[75] Inventors: Jia-Ming Shyu; Inn-Ming Chen; Tian-Quey Lee; Yunn-Chiang Kung, all of Hsin-Chu Hsien, Taiwan

[73] Assignee: Industrial Technology Research Institute, Hsin-Chu Hsien, Taiwan

[21] Appl. No.: 183,987

[22] Filed: Apr. 20, 1988

[51] Int. Cl.$^4$ .............................................. G06K 9/00
[52] U.S. Cl. ........................................ 382/9; 382/11; 382/10; 382/48; 382/29
[58] Field of Search .................. 382/10, 11, 9, 34, 48, 382/22, 41, 51, 1, 29

[56] References Cited

U.S. PATENT DOCUMENTS

| 4,097,847 | 6/1978 | Forsen | 382/52 |
| 4,559,644 | 12/1985 | Kataoka | 382/9 |
| 4,567,609 | 1/1986 | Metcalf | 382/34 |

FOREIGN PATENT DOCUMENTS 8707057 11/1987 World Int. Prop. O. .............. 382/9

Primary Examiner—Reinhard J. Eisenzopf
Assistant Examiner—Jose M. Solis
Attorney, Agent, or Firm—Birch, Stewart, Kolasch & Birch

[57] ABSTRACT

An apparatus and method for automatically recognizing the characters on a license plate which is fixed on a vehicle. A sensor/controller device is utilized to detect whether the vehicle has reached a predetermined position for image sampling, and to release a trigger signal when the vehicle has reached the predetermined position. An image processing unit is coupled to the sensor/controller device to receive the trigger signal and then to send an image-sampling instruction to an image-sampling device. The image-sampling device is coupled to the image processing unit, and samples a vehicle image including the image of the license plate in response to the image-sampling instruction. The vehicle image is converted into an electric signal by the image-sampling device, which in turn is sent back to the image processing unit. The image processing unit digitizes the electric signal, and process the digitized electric signal to estimate the position of the license plate, to determine the bounding edges of the characters on the license plate, to separate each character on the license plate, and to recognize each separated character.

6 Claims, 7 Drawing Sheets

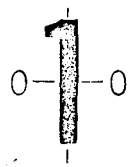 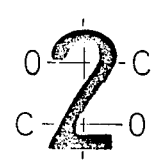 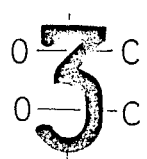 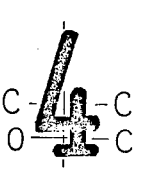 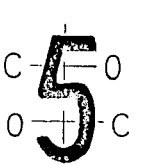
Fig. 9A     Fig. 9B     Fig. 9C     Fig. 9D     Fig. 9E
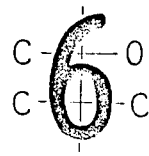 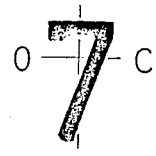 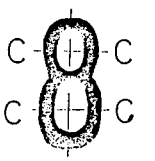 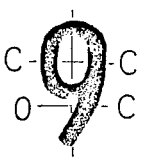 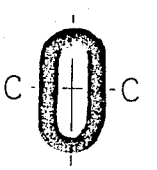
Fig. 9F     Fig. 9G     Fig. 9H     Fig. 9I     Fig. 9J

METHOD AND APPARATUS FOR AUTOMATICALLY RECOGNIZING LICENSE PLATE CHARACTERS

BACKGROUND OF THE INVENTION

The present invention relates to a method and an apparatus for automatically recognizing characters on license plates fixed on vehicles crossing a predetermined path. The vehicle may be an automobile, bus, truck, tractor-trailer or the like. The character-recognizing method and apparatus utilize an image processing technique to monitor the passing vehicle automatically. The present invention may be used in vehicle flow statistics, the checking of stolen vehicles, automatic charging systems in parking lots or the like, garage management and so on.

In general, visual means (eyes or television monitors) are used to recognize the characters on vehicles' license plates in order to identify the vehicle. This process has been found to be inconvenient, time-consuming and mistake prone.

It should be understood that in this specification the term "characters" is intended to mean and cover the letters of the alphabet, digits, special symbols and the like, which may be formed on license plates fixed on vehicles.

SUMMARY OF THE INVENTION

Consequently, the primary object of the present invention is to provide a method and an apparatus for automatically recognizing license plate characters enabling the elimination of the existing control and management by people.

According to one aspect of the present invention, an apparatus for automatically recognizing the characters on a license plate which is fixed on a vehicle comprises a sensor/controller means for detecting the vehicle, to determine whether the vehicle has reached a predetermined position, and for releasing a trigger signal when the vehicle has reached the predetermined position; an image-sampling means for sampling a vehicle image including the image of the licence plate in response to the trigger signal, and for converting the vehicle image into an electric signal; and an image processing means, coupled to the image-sampling means for receiving the electric signal, for digitizing the received electric signal, and for processing the digitized electric signal to estimate the position of the license plate, to determine the bounding edges of the characters on the license plate, to separate each character on the license plate, and to recognize each separated character.

According to another aspect of the present invention, in a digital information processing device a method for processing an image pixel array representing a vehicle image including the image of a license plate which is fixed on the vehicle, and contains a plurality of characters thereon, comprises the steps of:

(a) along a direction traverse to the characters on the license plate, selecting a first row of the image pixel array as an operating row;

(b) calculating a set of gray level changing values between each two adjacent pixels in the selected operating row to form a first differential waveform;

(c) determining whether the first differential waveform contains a waveform part within a predetermined waveform range, when the first differential waveform does not contain a waveform part within the predetermined waveform range, selecting the next row separated at a predetermined interval from the selected operating row to substitute for the operating row, and repeating the steps (b) and (c), when the first differential waveform contains a waveform part within the predetermined waveform range, estimating an initial and terminal points of the waveform part;

(d) expanding a first checking area from the initial point and a second checking area from the terminal point;

(e) determining the four bounding edges of the characters on the license plate from the first and second checking area to select a character pixel array out of the image pixel array;

(f) along a direction parallel to the characters, calculating a respective gray level average of each column of the character pixel array;

(g) calculating a second differential waveform from the calculated gray level averages;

(h) determining the position of each character on the license plate from the second differential waveform; and (i) detecting the stroke characteristics of each character to recognize the characters.

BRIEF DESCRIPTION OF THE DRAWINGS

The present invention can be more fully understood by reference to the following detailed description and accompanying drawings, which form an integral part of this application:

FIG. 9a to 9j are schematic views for illustrating a direction code analytic method to recognize the Arabic numerals 1, 2, 3, 4, 5, 6, 7, 8, 9 and 0.

DETAILED DESCRIPTION OF THE PREFERRED EMBODIMENTS

Figure 1:
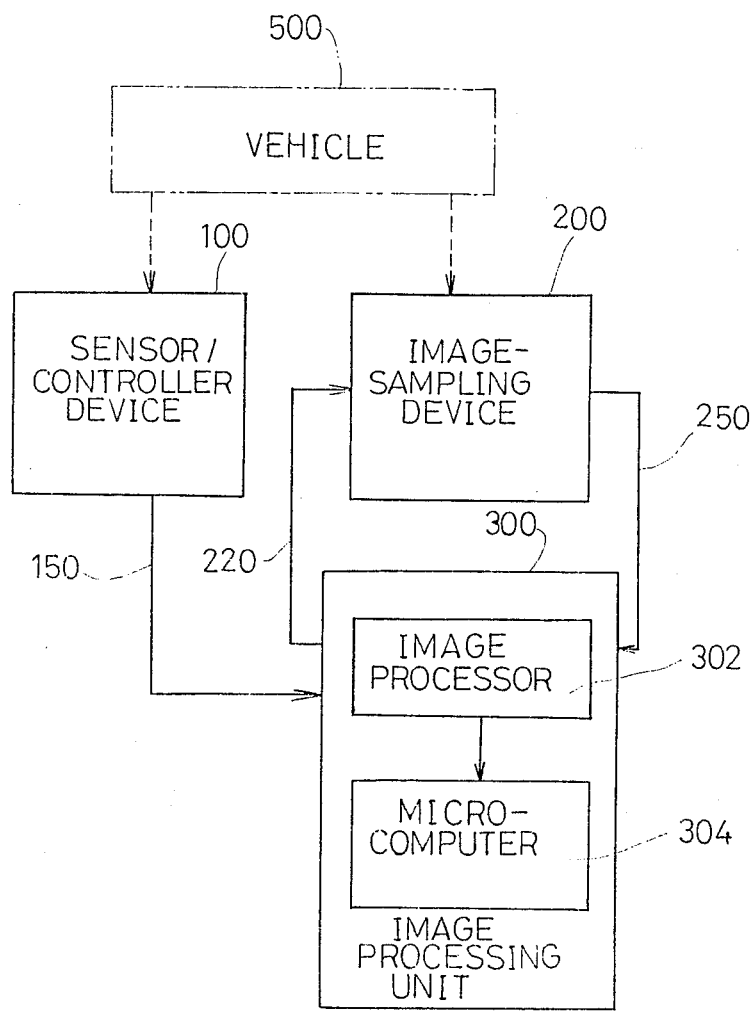
FIG. 1 is a block diagram of a license plate character-recognizing system according to the present invention.

Referring now to FIG. 1, there is shown a block diagram of an automatic recognition system for the characters on a license plate according to the present invention. The system includes a sensor/controller device 100 utilized to detect a vehicle 500 having reached a predetermined position, and then to release a trigger signal via a line 150. An image processing unit 300 is coupled to the sensor/controller device 100 for being activated by the trigger signal to send an image-sampling instruction via a line 220 to an image-sampling device 200 which is coupled to the image processing unit 300. The image-sampling device 200 will sample the image of the vehicle 500 and convert it into an image signal. The image signal is in turn sent back to the image processing unit 300 for being digitized via a line 250. Consequently, the image processing unit 300 can process the digitized image signal to recognize the characters on a license plate, which is fixed on the vehicle 500, by a special image processing technique to be described in detail hereinafter.

Figure 2:
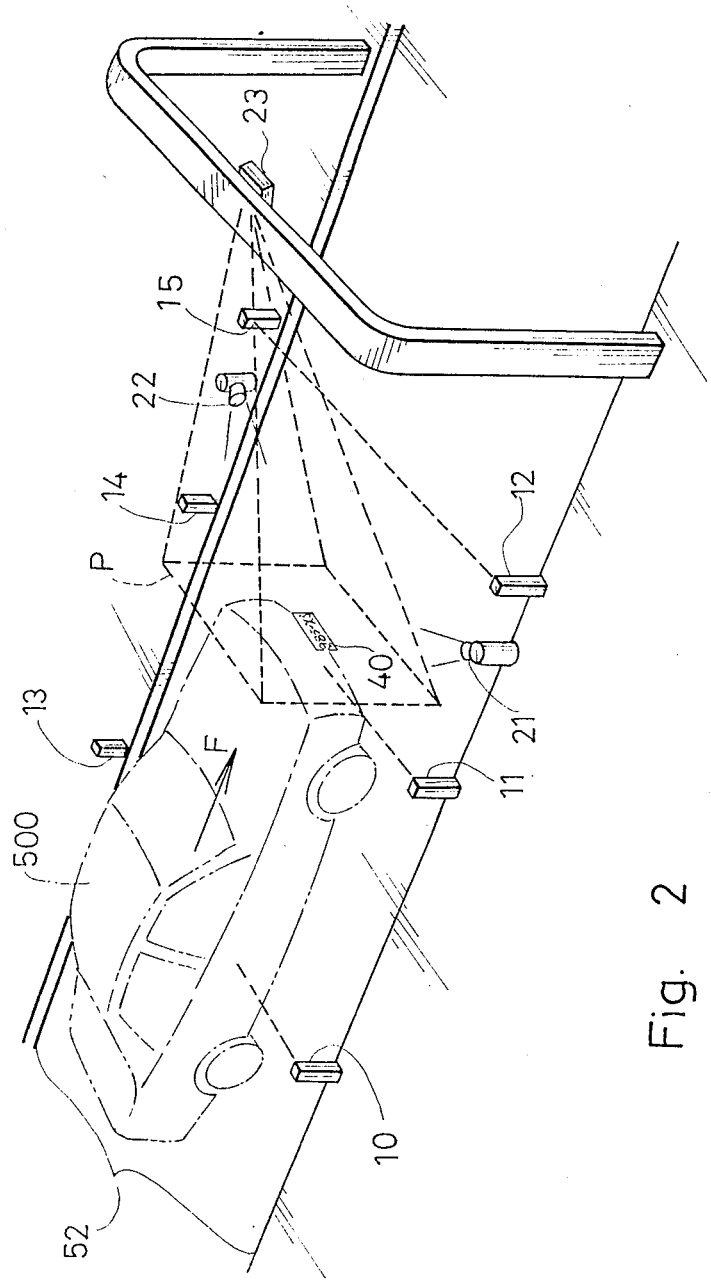
FIG. 2 is a perspective view of an image-sampling arrangement according to one preferred embodiment of the present invention.

With reference to FIG. 2, the sensor/controller device 100 includes three pairs of through-beam photo sensors 10, 13; 11, 14; 12, 15 respectively arranged along two sides of a vehicle driving path 52. Each pair of photo sensors consists of a photo transmitter (10, 11 12) on one side and a corresponding receiver (13, 14, 15) on the other side. The vehicle 500 includes a license plate 40 fixed in front thereof, and is driven in the direction shown by an arrow F in FIG. 2 along a predetermined driving path 52. At first, the photo sensor pair 10, 13 detects whether the vehicle 500 has entered the monitoring area since the light transmitted by the transmitter 10 is blocked by the vehicle 500, and thus is not received by the receiver 13. The pair of photo sensors 11, 14 detects when the vehicle 500 has reached the position shown in FIG. 2. The distance between the two pairs of photo sensors 10, 13; 11, 14 is preferably smaller than the length of the vehicle 500. The image-sampling device 200 includes an image-sampling box 23 mounted over the predetermined driving path 52. When the two pairs of photo sensors 10, 13; 11, 14 both detect the passing of the vehicle 500, the sensor/controller device 100 activates the image-sampling box 23 to sample the image of the vehicle 500. The sampled image of the vehicle 500 focuses on a plane P including the license plate 40. To prevent the sampled image from not including the image of the license plate 40 due to the possible shading by another vehicle in front of the shown vehicle 500, the photo sensor pair 12, 15 is preferably arranged to whether or not there is another vehicle shading the vehicle 500 which is being sampled.

Figure 3:
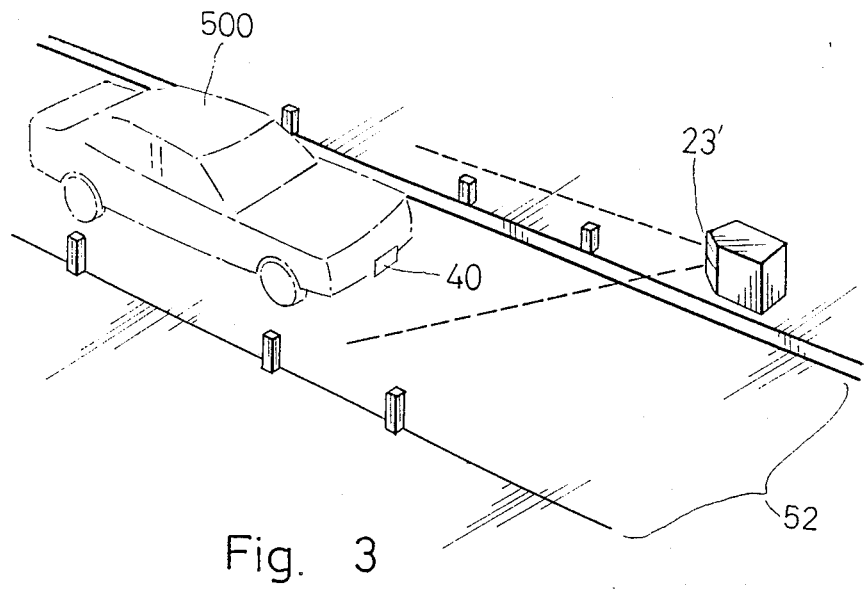
FIG. 3 is a perspective view of an image-sampling arrangement according to the other preferred embodiment of the present invention.

The image-sampling device 200 also includes two light sources 21, 22 mouthed at adequate places to illuminate the license plate 40 as shown in FIG. 2. In another preferred embodiment, the image-sampling box 23' is mounted beside the driving path 52, as shown in FIG. 3. Although in FIGS. 2 and 3 the image-sampling box 23 is mounted to sample the front image of the vehicle 500, it should be understood it also can be mounted at an adequate place to sample the rear side including the image of a rear license plate (not shown) of the vehicle 500. In the later case, the positions of the above-described three pairs of photo sensors have to be properly altered to monitor the passing of the vehicle 500 and to determine the exact time to sample the image of the vehicle. Since this can be achieved by those ordinarily skilled in the art, upon reading this specification, a detailed description is deemed unnecessary.

Figure 4:
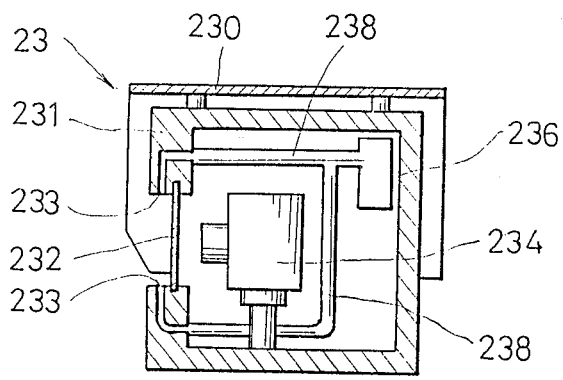
FIG. 4 is a cross-sectional view of an image-sampling box of the present invention.

The three pairs of photo sensors 10, 13; 11, 14; 12, 15 are all preferably an ultraviolet sensor pair. The image-sampling box 23 is preferably a solid-state camera. The light sources 21 and 22 may be an infrared ray source. To avoid being affected by climate, dust, temperature, vibrations and other natural conditions, referring to FIG. 4, the image-sampling box 23 includes a box-like body 231, a protective cover 230 covering the upper portion of the box-like body 231, a camera 234 fastened within the box-like body 231, and a filter 232 mounted on the box-like body 231 and in front of the lens of the camera 234. The image-sampling box 23 may also include a compressed air source 236 to clear the front surface of the filter 232, as shown in FIG. 4 by way of a plurality of currents of air via a plurality of tubes 238 and nozzles 233.

Figure 5:
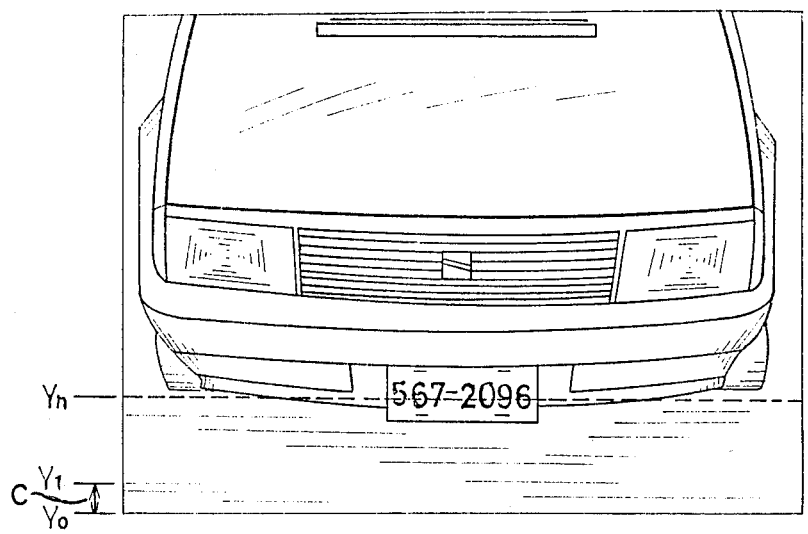
FIG. 5 is a schematic view of a sampled image by the image-sampling arrangement.

FIG. 5 presents an example of the vehicle image sampled by the image-sampling device 200. With reference to FIG. 1, the image processing unit 300 includes an image processor 302 and a microcomputer 304. The sampled vehicle image is sent to the image processor 302, and converted into a digital image signal by the image processor 302. The digitized image signal is then entered into the microcomputer 304 for processing to recognize the characters on the license plate 40. The processes undertaken by the microcomputer 304 include estimating the position of the license plate, determining the bounding edges of the characters on the license plate, separating each character, and recognizing each character. These processes are achieved by the combined hardware and software of the microcomputer, and will be described in detailed hereinafter.

ESTIMATING THE POSITION OF THE LICENSE PLATE

Figure 6:
FIG. 6 is a schematic view of a differential waveform calculated from the pixels of the line Yn illustrated in FIG. 5.
Figure 10:
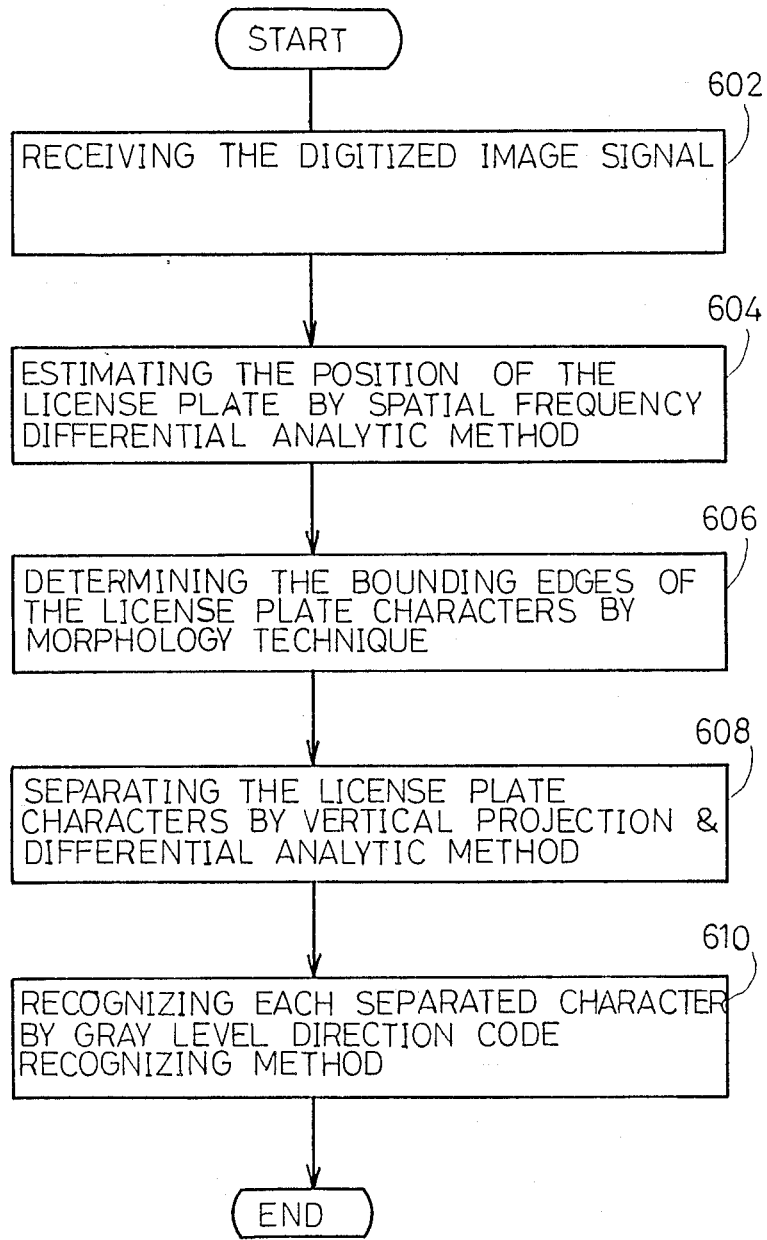
FIG. 10 is a flow chart of a character-recognizing process according to the present invention.

The digitized image signal consists of an array of pixels and the gray levels of the pixels, and is received by, and stored within the microcomputer 304 as in the block 602 of FIG. 10. The variation of the gray levels of each horizontal row or vertical column of vehicle image row or column forms a waveform having frequency characteristics, in this art generally called "spatial frequency". The inventors found that the spatial frequency at the characters of the license plate has violent variations. This can be utilized to estimate the position of the license plate. This method is called a spatial frequency differential analytic method. Referring to FIG. 5, at first from the lower side of the vehicle image, a first row in the pixel array representing a horizontal image line YO is selected, and then a differential process is undertaken. In other words, the gray level of each pixel is subtracted from the gray level value of the adjacent pixel to obtain the variation of their gray level and then to form a differential waveform. If the differential waveform does not include a waveform part having a predetermined frequency characteristic which should appear if the selected row of pixels includes the character image of the license plate, the next row of pixels representing another horizontal image line Y1 separated at an interval C from the line YO, is selected to undertake a differential process. The interval C is preferably smaller than the height of the characters on the license plate. The differential process is undertaken line by line in an upward sequence until the formed differential waveform contains the predetermined frequency characteristic. For example, at a line Yn which crosses the characters of the license plate as shown in FIG. 5, the calculated differential waveform is shown in FIG. 6, and contains an intermediate part (from a point 1 to a point r) having a violent variation of spatial frequency. The predetermined frequency characteristic includes three adequate ranges of frequency-length, frequency-length width, and amplitude of the differential waveform. The term "frequency-length" refers to the distance between two adjacent wave crests or wave troughs of the differential waveform. The term "frequency-length width" refers to the total width of several continuous frequency-lengths. The term "amplitude" refers to the height between one wave crest and one wave trough adjacent thereto. Since the characters formed on a license plate has specific and uniform patterns, their spatial variations and their image sizes will be within adequate ranges on the basis of the same image-sampling conditions. Whether the calculated differential waveform is a waveform representing a line passing across the license plate character can therefore be easily determined. By this method, the rough position of the license plate can be determined. For example, in FIG. 6 the rough position is from the initial point 1 of the intermediate part having violent spatial variation, to its terminal point r. The above process is achieved in block 604 of FIG. 10.

DETERMINING THE BOUNDING EDGES OF THE CHARACTERS

This process is intended to determine the exact left, right, upper and lower bounding edges of the license plate characters utilizing the following morphology technique to accomplish this.

Figure 7:
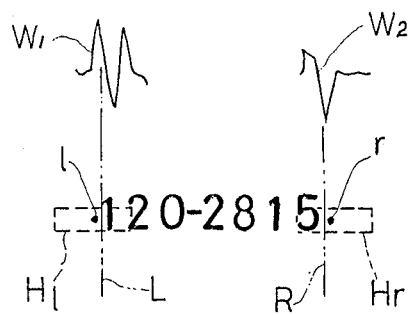
FIG. 7 is a schematic view for illustrating a differential projection technique to determine the left and right bounding edges of the characters on a license plate.

1. With reference to FIG. 7, the left and right bounding edge line are initially determined by the following steps:

(a) setting a left and right processing area: expand upwards, downwards, leftwards and rightwards from the central point 1 to form a rectangular processing area Hl on the left. Also expand upwards, downwards, leftwards and rightwards from the central point r to form a rectangular processing area Hr on the right. The areas Hl and Hr are horizontally rectangular as shown in FIG. 7;

(b) performing a horizontally morphologically thinning process: within the areas Hl and Hr, compare the gray level values of each three adjacent pixels in each horizontal row of the pixel array, and select the maximum value to represent the central pixel, respectively. In this way, the strokes of the characters can be thinned in a horizontal direction;

(c) performing a vertically morphological projection: within the thinned areas Hl and Hr, select the minimum value from all gray level values of each vertical column of the pixel array to represent the column as vertically morphological projection values, respectively. In this way, a left and right set of vertically morphological projection values are obtained; and (d) calculating the differential values between the left set of vertically morphological projection values to form a left differential waveform W1. The left bounding edge line L of the license plate characters is therefore determined at the first left wave crest of the left differential waveform W1. Similarly, calculating the differential values between the right set of vertically morphological projection values to form a right differential waveform W2. The right bounding edge line R of the license plate characters is determined at the last right wave trough of the right differential waveform W2.

Figure 8:
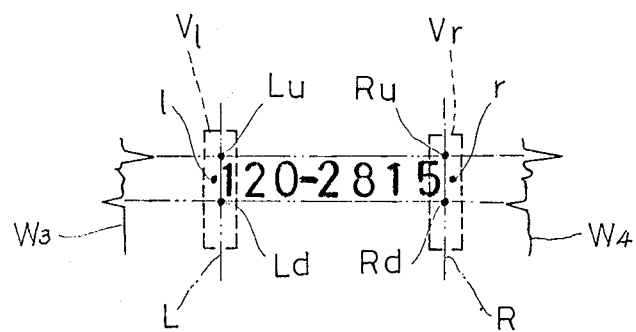
FIG. 8 is a schematic view for illustrating a differential projection technique to determine the upper and lower bounding edges of the characters on the license plate.

2. With reference to FIG. 8, an upper and lower edge points Lu and Ld on the left bounding edge line L, and an upper and lower edge points Ru and Rd on the right bounding edge line R are then determined. To accommodate the possibility of the slanting condition of the license plate and to promote the accuracy of the analysis, the left and right upper and lower bounding edges are determined separately. The processing method in this step is similar to the method described above for determining the left and right bounding edge line L and R. The difference is that the vertically rectangular left and right processing areas Vl and Vr are expanded from the central points l and r, respectively. The morphologically thinning process in this step takes place in a vertical direction, and the morphological projection process in this step takes place in a horizontal direction. One example of the calculated differential waveforms W3 and W4 in this steps are shown in FIG. 8. Consequently, the upper and lower edge points Lu, Ru; Ld, Rd can be easily determined in a manner similar to the one described above, and the four bounding edges of the license plate characters can also be determined.

The above steps are achieved in the block 606 of FIG. 10.

SEPARATING THE LICENSE PLATE CHARACTERS

This process of separating each character from the bounded license plate characters includes the following steps:

1. performing a vertical gray level projection averaging step: within the area of the bounded license plate characters, averaging the gray levels of each vertical column of pixels to obtain a gray level projection value.

2. performing a differential and characteristic analyzing step: calculating the differential values between the above gray level projection values to obtain a differential waveform. The differential waveform must contain a plurality of wave crests and wave troughs corresponding to the blanks between characters (character intervals hereafter). Each character may correspond to several wave crests and wave troughs of the differential waveform. Since each two license plate characters have a fixed character interval, each character can be separated by reference to the fixed character interval and by analyzing the characteristics of the wave crests and wave troughs. This process is done in the block 608 of FIG. 10. Since this can be easily achieved by those skilled in the art, upon reading the description, no further description is deemed necessary.

RECOGNIZING CHARACTERS

A gray level direction code recognizing method is used in this preferred embodiment to recognized each separated character. The method includes the steps of:

1. Calculating a gray level differential waveform (spatial frequency variation) along the vertical central line of each character;

2. Finding out the position (or positions) of the wave troughs, which indicate the intersecting points of the vertical central line with the strokes of the character;

3. From the central points (or point) between each two adjacent intersecting points toward left and right horizontal directions, detecting, respectively, whether there is an existing stroke. If there is, the direction code is set to "C"; if there is not, the direction code is et to "O". Referring to FIG. 9a to 9j, there is shown the direction codes of numerals 1, 2, 3, 4, 5, 6, 7, 8, 9 and 0. Such direction codes are stored within the microcomputer 304 in advance; and 4. Comparing the detected direction codes with the stored-in-advance direction codes to recognize to which number the character corresponds to.

The above process is done in the block 610 of FIG. 10. The numbers recognized by the microcomputer 304 can be utilized to identify the vehicle 500, and can also be applied to other purposes, for example, an automatic billing system for a parking lot.

The gray level direction code recognizing method can swiftly check the stroke characteristics of the character for recognizing the character, and has a relatively high reliability. It should be understood that although in this description only the direction codes of numerals 0 to 9 are illustrated, the method can be applied to the letters of the alphabet, and other special symbols in a similar manner. Since this can be achieved by those skilled in the art, upon reading this description, no further description is deemed necessary.

While the invention has been described in terms of what is presently considered to be the most practical and preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. An apparatus for automatically recognizing the characters on a license plate which is fixed on a vehicle comprising:
   sensor/controller means for detecting said vehicle, for determining whether said vehicle has reached a predetermined position, and for releasing a trigger signal when said vehicle has reached said predetermined position, said sensor/controller including first, second, and third pairs of photosensors respectively arranged along two sides of a vehicle driving path;
   an image-sampling means for sampling a vehicle image including the image of said license plate in response to said trigger signal, and for converting said vehicle image into an electric signal, wherein said sensor/controller activates said image sampling device to indicate that said vehicle has reached a predetermined position when a light path between both said first and second pairs of photosensors is interrupted, said third photosensor pair being arranged to ascertain that said license plate is not shaded by another vehicle, wherein the distance between said first and second photosensor pairs is smaller than the length of said vehicle so that when said vehicle has reached a predetermined position, both of said first and second photosensor pairs detect the presence of said vehicle; and
   an image processing means, coupled to said image sampling means for receiving said electric signal, for digitizing said received electric signal, and for processing said digitized electric signal to estimate the position of said license plate, to determine the bounding edges of the characters on said license plate, to separate each character on said license plate, and to recognize each separated character.

2. In a digital information processing device, a method for processing an image pixel array representing a vehicle image including the image of a license plate which is fixed on said vehicle, and contains a plurality of characters thereon, said method comprising the steps of:
   (a) selecting a first row of said image pixel array as an operating row along a direction traverse to said characters on said license plate;
   (b) calculating a set of gray level changing values between each two adjacent pixels in said selected operating row to form a first differential waveform;
   (c) determining whether said first differential waveform contains a waveform part within a predetermined waveform range,
   when said first differential waveform does not contain a waveform part within said predetermined waveform range, selecting the next row separated at a predetermined interval from said selected operating row to substitute for said operating row, and repeating said steps (b) and (c),
   when said first differential waveform contains a waveform part within said predetermined waveform range, estimating an initial and terminal points of said waveform part;
   (d) expanding a first checking area from said initial point and a second checking area from said terminal point;
   (e) determining the four bounding edges of said characters on said license plate from said first and second checking areas to select a character pixel array out of said image pixel array;
   (f) calculating a respective gray level average of each column of said character pixel array along a direction parallel to said characters;
   (g) calculating a second differential waveform from said calculated gray level averages;
   (h) determining the position of each character on said license plate from said second differential waveform; and
   (i) detecting the stroke characteristics of each character to recognize said characters by determining a vertical central line of each character calculating a third differential waveform of a column of said character pixel array, which represents said vertical central line, each wave trough of said third differential waveform indicating the intersecting point of said vertical central line and the stroke of said each character, and checking leftwards and rightwards from each intermediate point between each two adjacent intersecting points, the stroke characteristics of said character to recognize said character.

3. The apparatus as claimed in claim 1, wherein said first, second and third pairs of photo sensors are pairs of ultraviolet sensors.

4. The apparatus as claimed in claim 1, wherein said image sampling means includes a box-like body, a solid-state camera secured within said box-like body, a filter secured to said box-like body in front of the lens of said solid-state camera, and compressed air means for cleaning said filter.

5. The apparatus as claimed in claim 1, wherein said image processing means includes an image processing unit for digitizing said electric signal to an image pixel array and a plurality of gray level values in relation to the image pixels in said image pixel array, and a microcomputer coupled to said image processing unit to receive and process said image pixel array and said gray level values.

6. The apparatus as claimed in claim 5, wherein said microcomputer includes:

means for estimating an initial and terminal points of said license plate;

means for expanding a first checking area from said initial point and a second checking area from said terminal point;

means for determining the four bounding edges of said characters on said license plate from said first and second checking area to select a character pixel array out of said image pixel array;

means, along a direction parallel to said characters, for calculating a respective gray level average of each column of said character pixel array;

means for calculating a differential waveform from said calculated gray level averages;

means for determining the position of each character on said license plate from said differential waveform; and means for detecting the stroke characteristics of each character to recognize said characters.

* * * * *